F. L. FULLER.
CALCULATING MECHANISM.
APPLICATION FILED AUG. 13, 1909.

1,151,677.

Patented Aug. 31, 1915.
10 SHEETS—SHEET 1.

WITNESSES:

INVENTOR

BY

ATTORNEY

F. L. FULLER.
CALCULATING MECHANISM.
APPLICATION FILED AUG. 13, 1909.

1,151,677.

Patented Aug. 31, 1915.
10 SHEETS—SHEET 2.

WITNESSES:

INVENTOR
F. L. Fuller
BY
ATTORNEY

F. L. FULLER.
CALCULATING MECHANISM.
APPLICATION FILED AUG. 13, 1909.

1,151,677. Patented Aug. 31, 1915.
10 SHEETS—SHEET 3.

WITNESSES:

INVENTOR
F. L. Fuller
BY
ATTORNEY

F. L. FULLER.
CALCULATING MECHANISM.
APPLICATION FILED AUG. 13, 1909.

1,151,677.

Patented Aug. 31, 1915.
10 SHEETS—SHEET 4.

WITNESSES:

INVENTOR

BY

ATTORNEY

F. L. FULLER.
CALCULATING MECHANISM.
APPLICATION FILED AUG. 13, 1909.

1,151,677.

Patented Aug. 31, 1915.
10 SHEETS—SHEET 5.

WITNESSES:

INVENTOR
F. L. Fuller
BY
ATTORNEY

F. L. FULLER.
CALCULATING MECHANISM.
APPLICATION FILED AUG. 13, 1909.

1,151,677.

Patented Aug. 31, 1915.
10 SHEETS—SHEET 8.

WITNESSES:

INVENTOR
BY
ATTORNEY

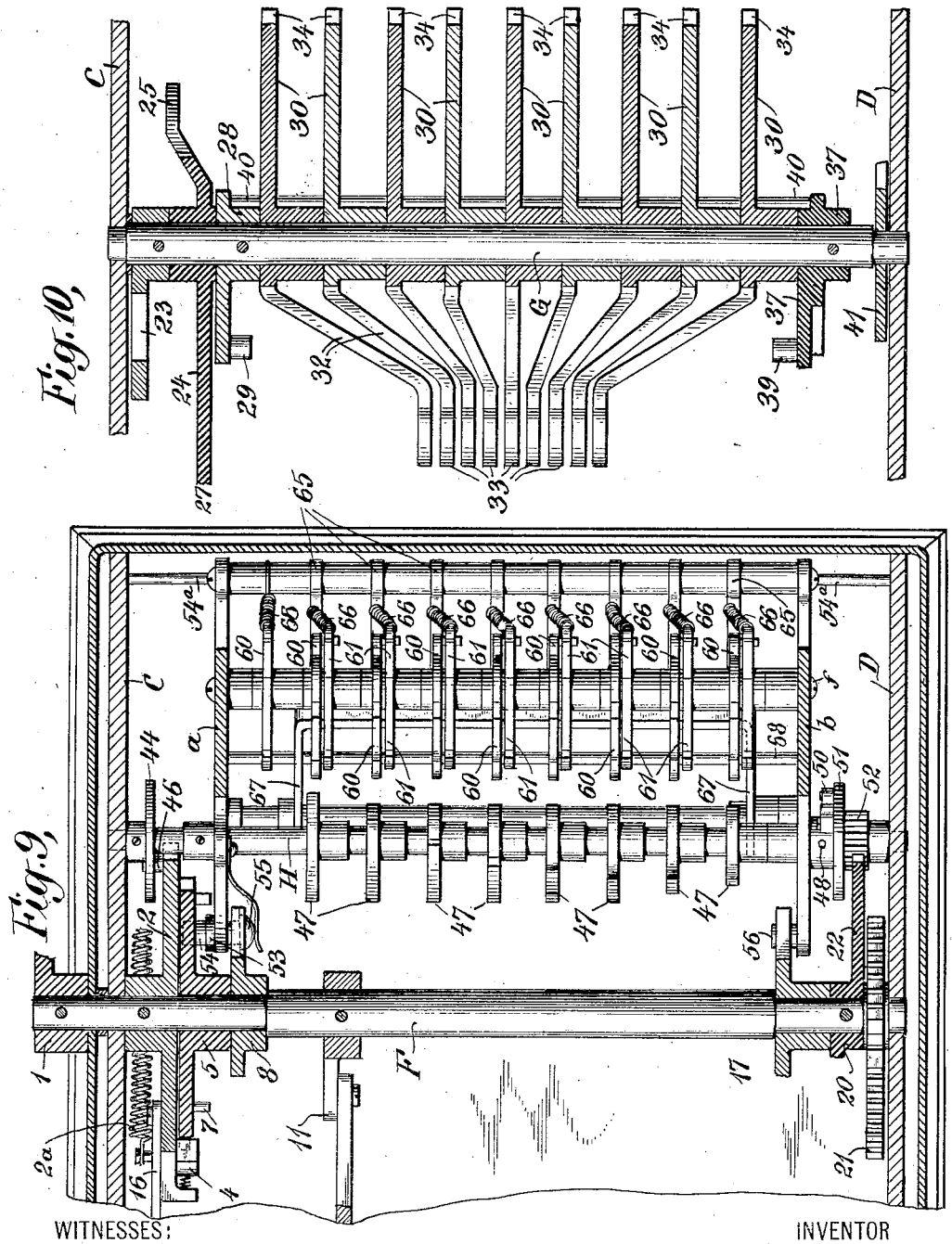

F. L. FULLER.
CALCULATING MECHANISM.
APPLICATION FILED AUG. 13, 1909.
1,151,677.
Patented Aug. 31, 1915.
10 SHEETS—SHEET 10.
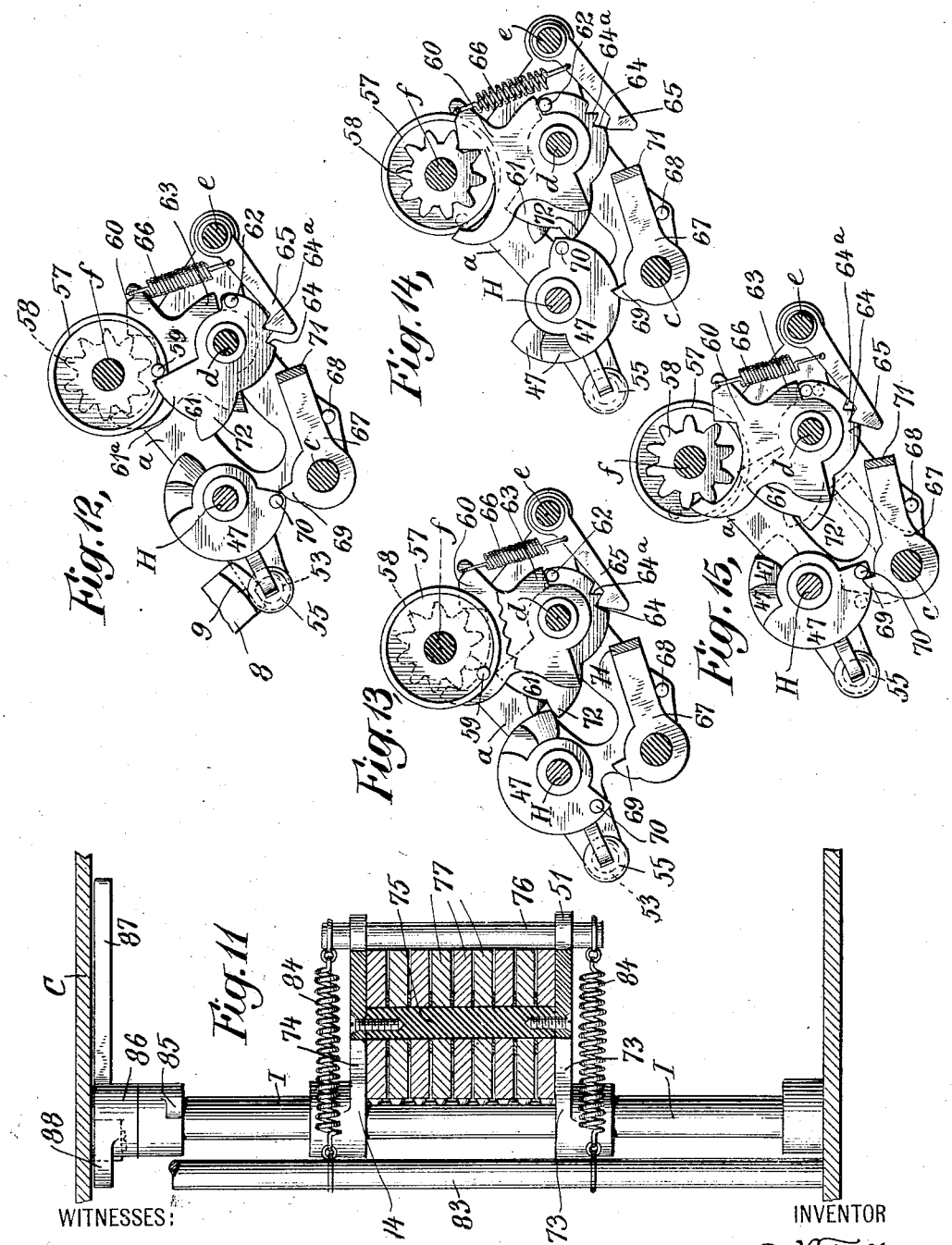

UNITED STATES PATENT OFFICE.

FREDERICK L. FULLER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CALCULATING MECHANISM.

1,151,677.  Specification of Letters Patent.  Patented Aug. 31, 1915.

Application filed August 13, 1909. Serial No. 512,627.

*To all whom it may concern:*

Be it known that I, FREDERICK L. FULLER, a citizen of the United States, residing at Dayton, in the county of Montgomery, in the State of Ohio, have invented certain new and useful Improvements in Calculating Mechanism, of which the following is a specification.

My invention relates to calculating mechanism, and has for its object the production of a simple mechanism which can be readily operated to add and tabulate numbers and their sums.

Figure 1:
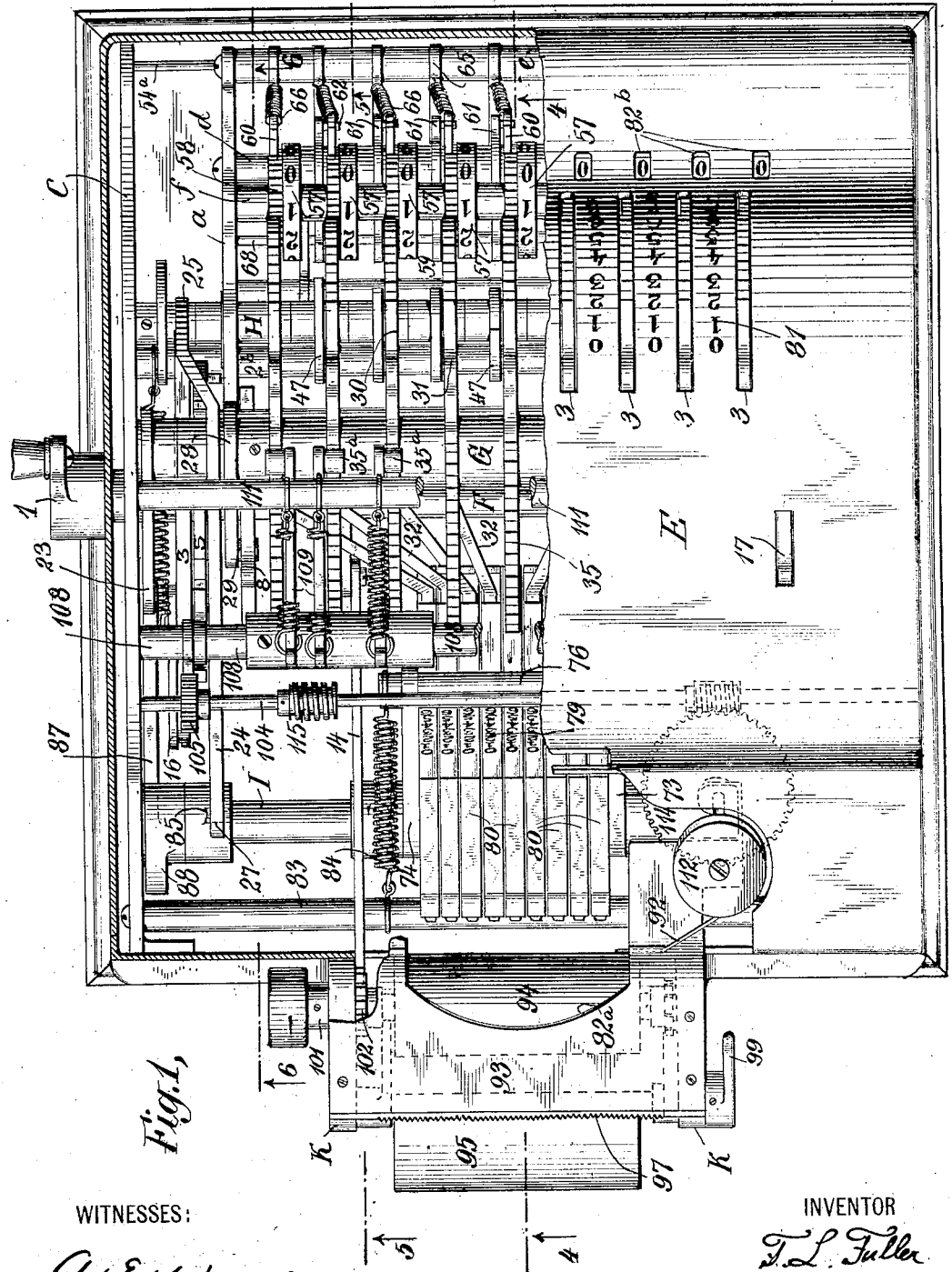
Figure 2:
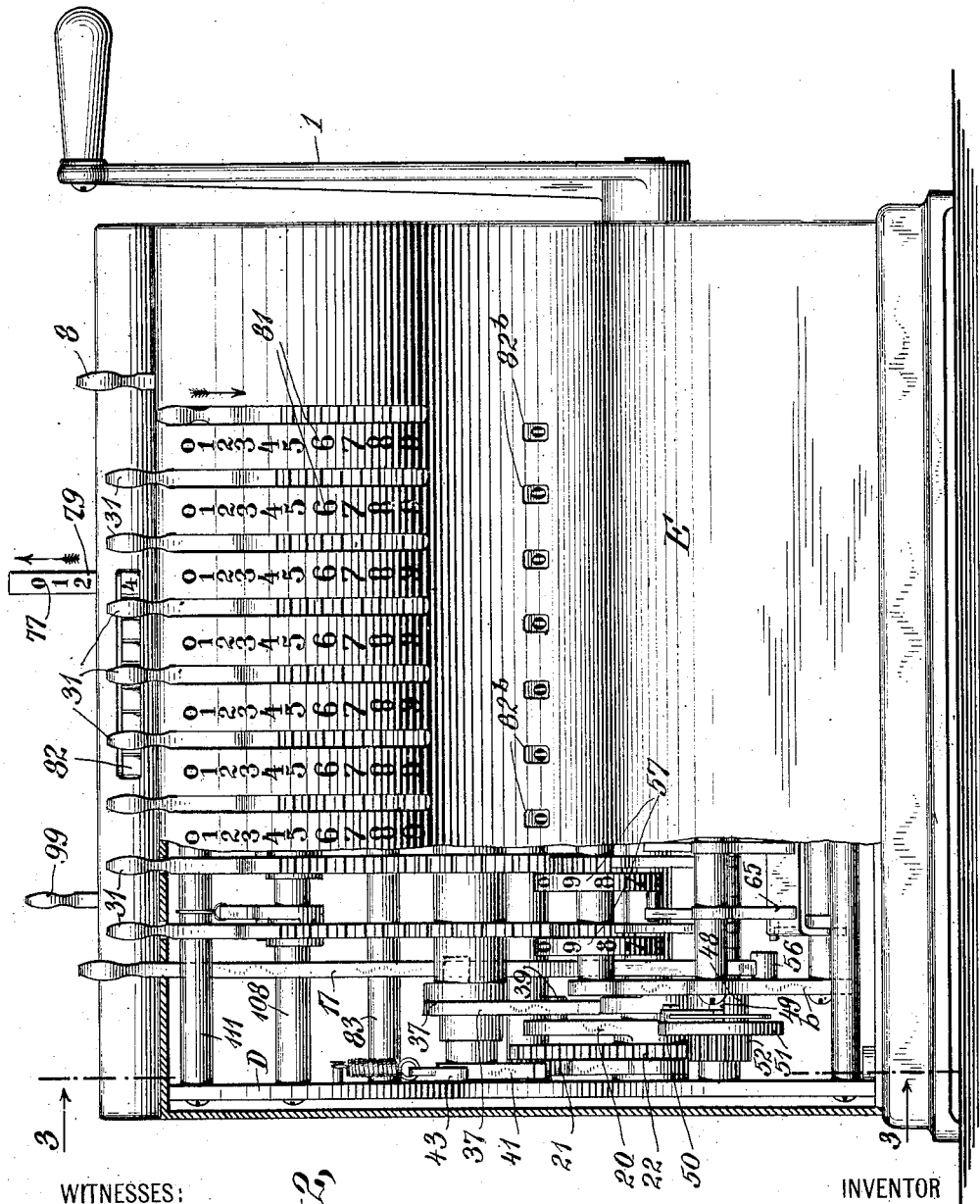
Figure 3:
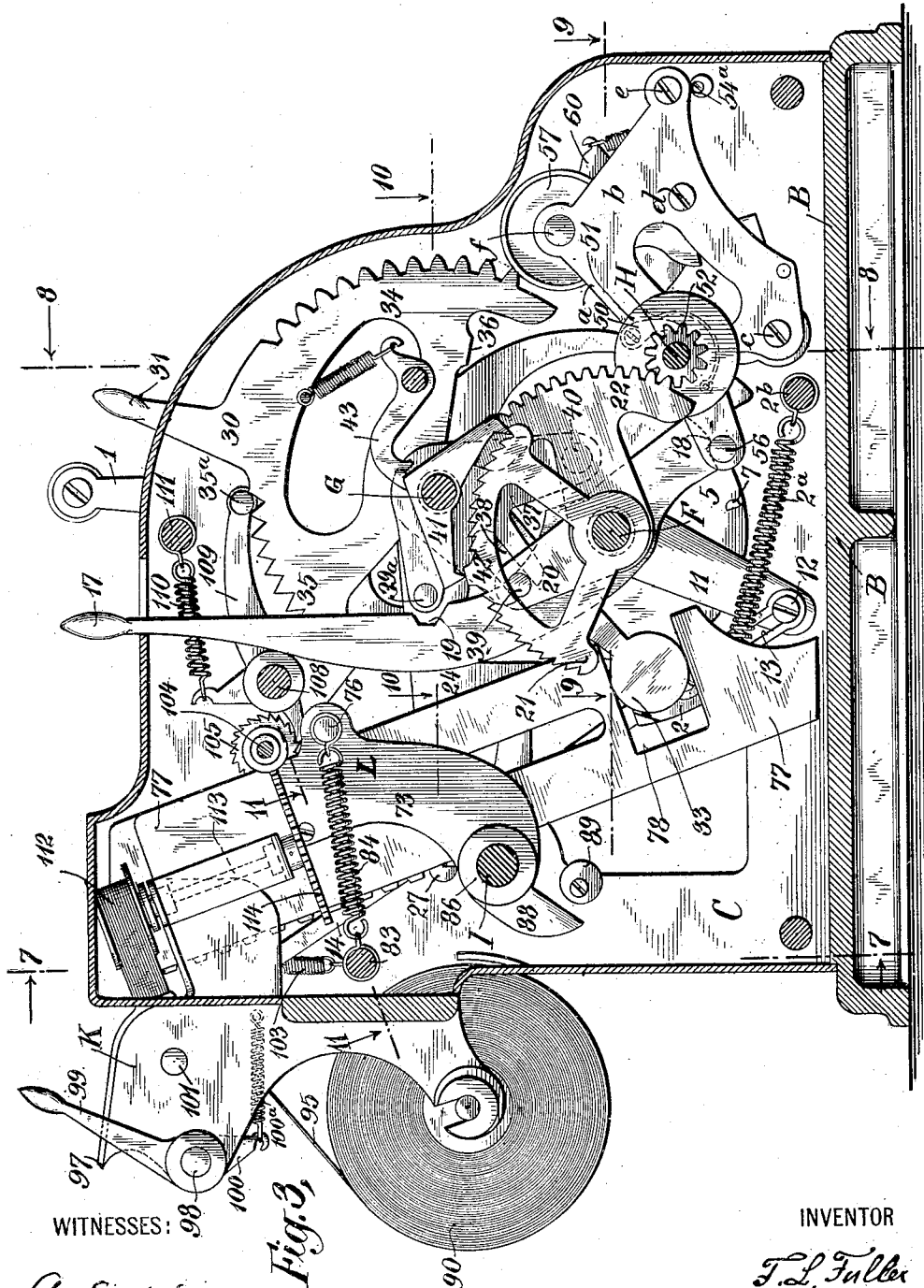
Figure 4:
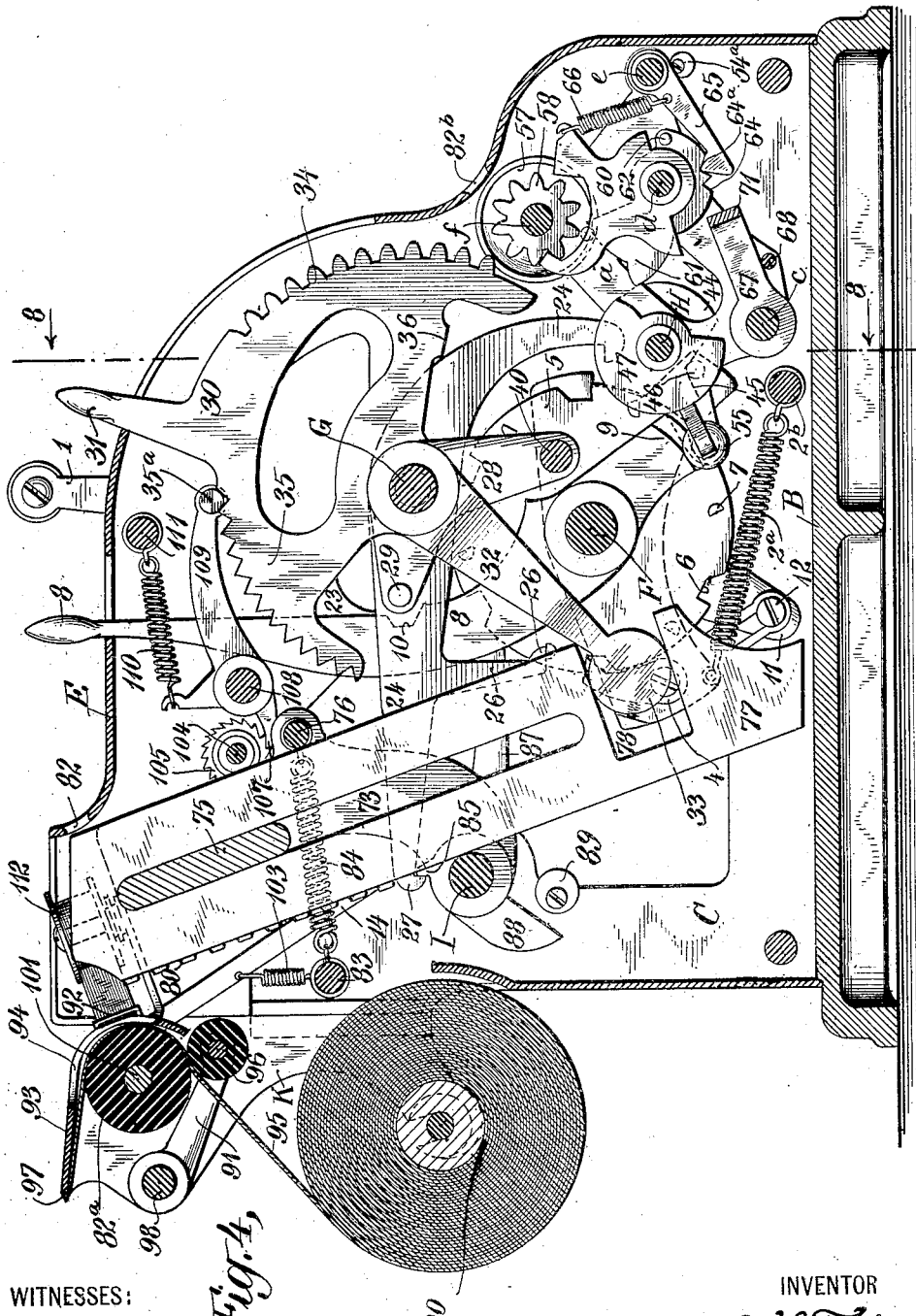
Figure 5:
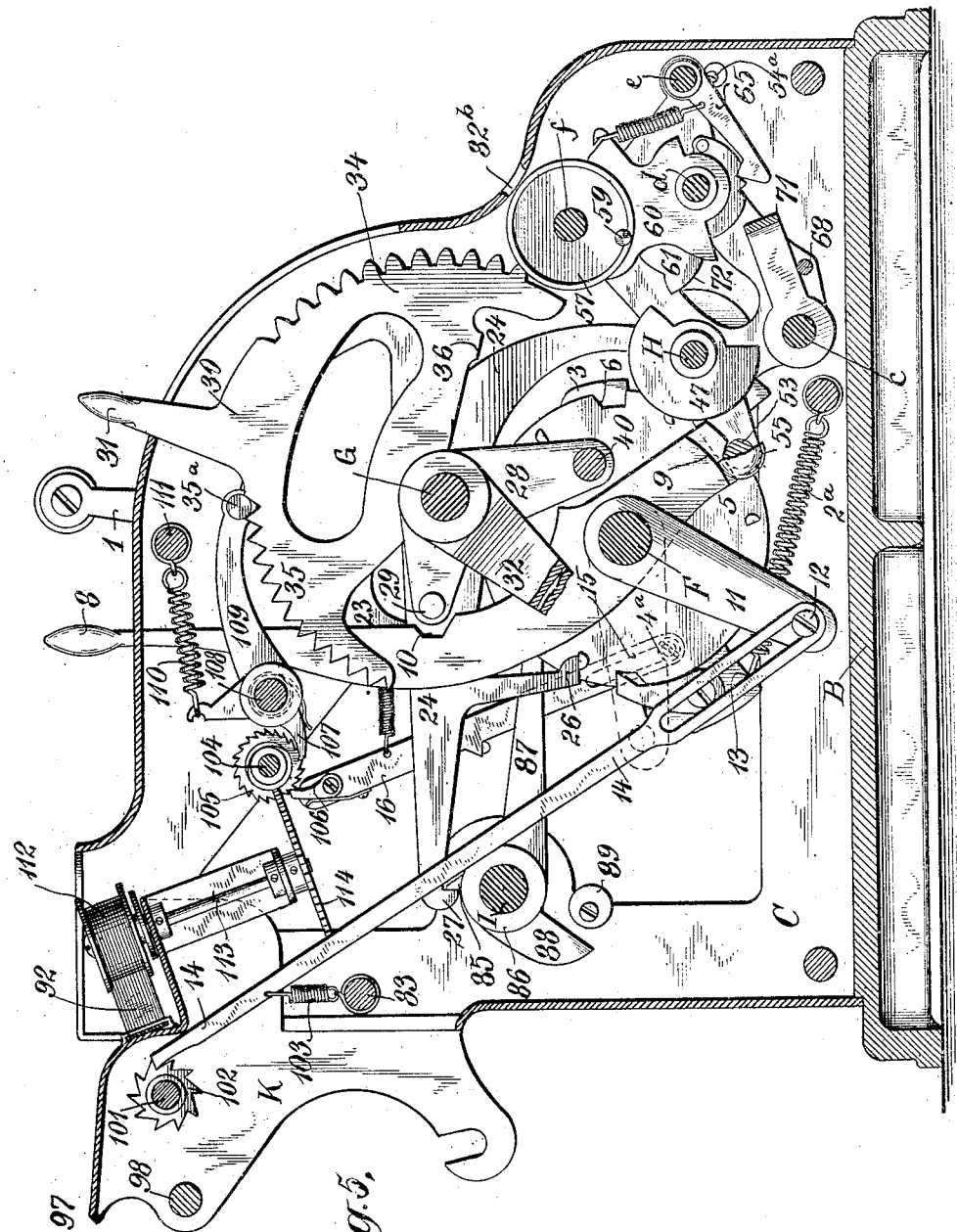
Figure 6:
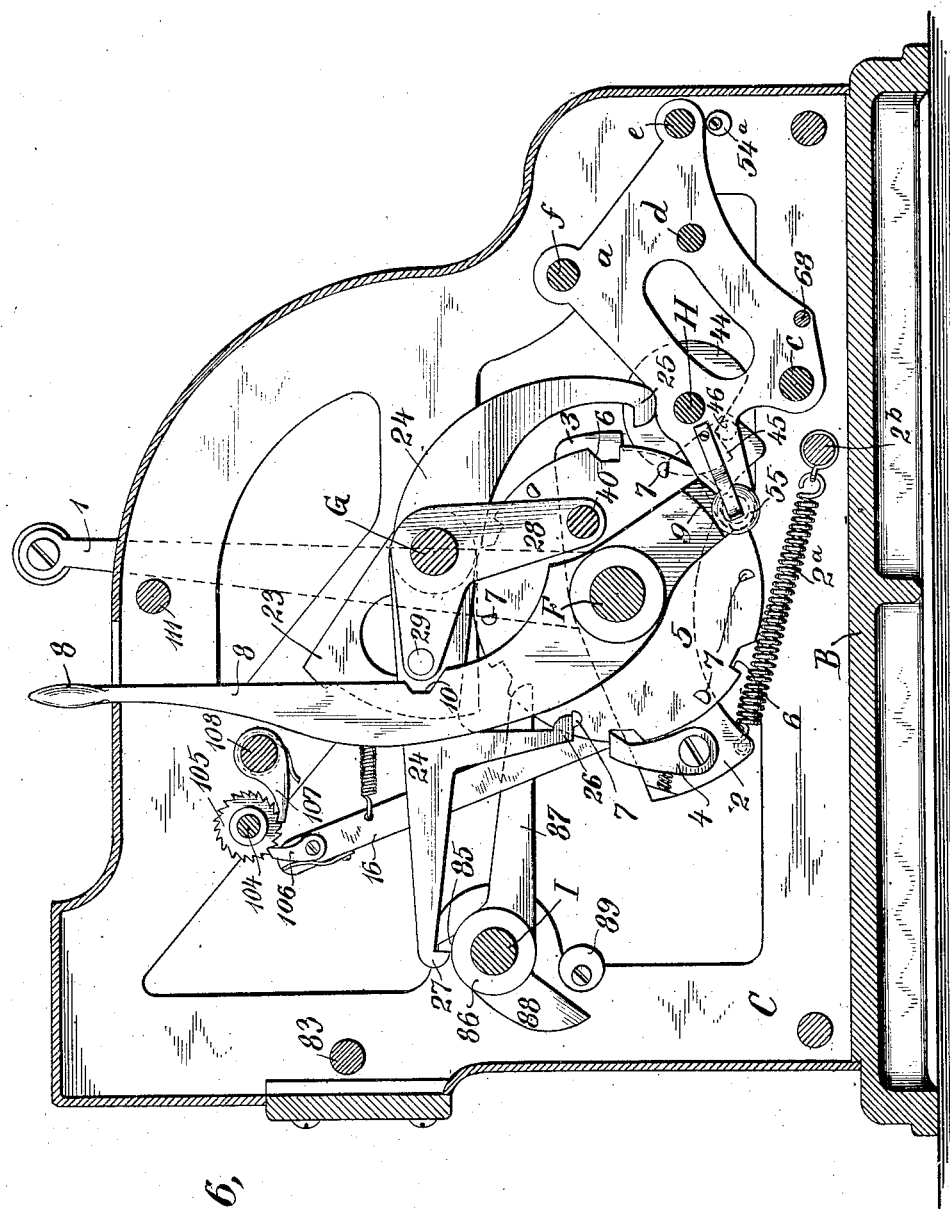
Figure 7:
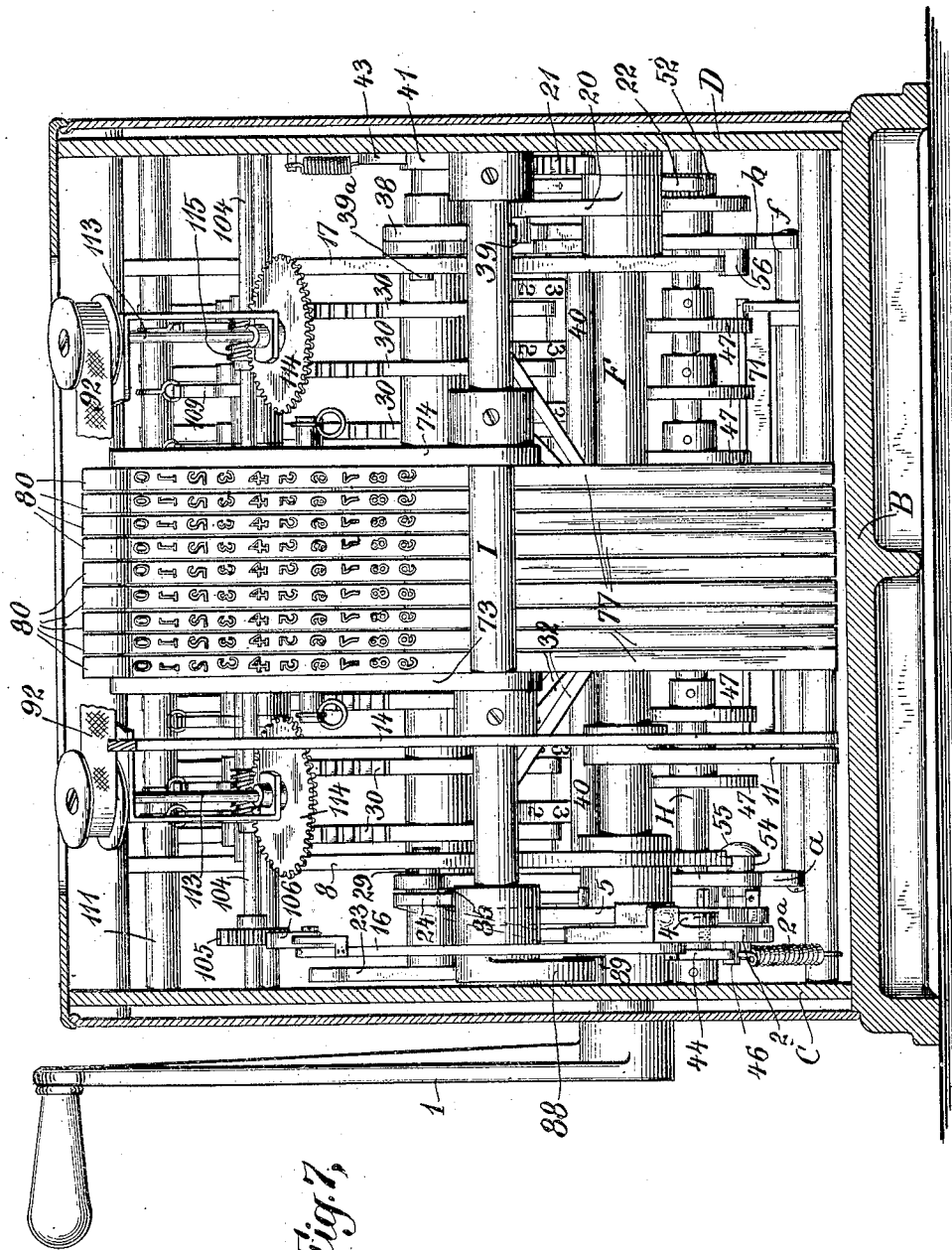
Figure 8:
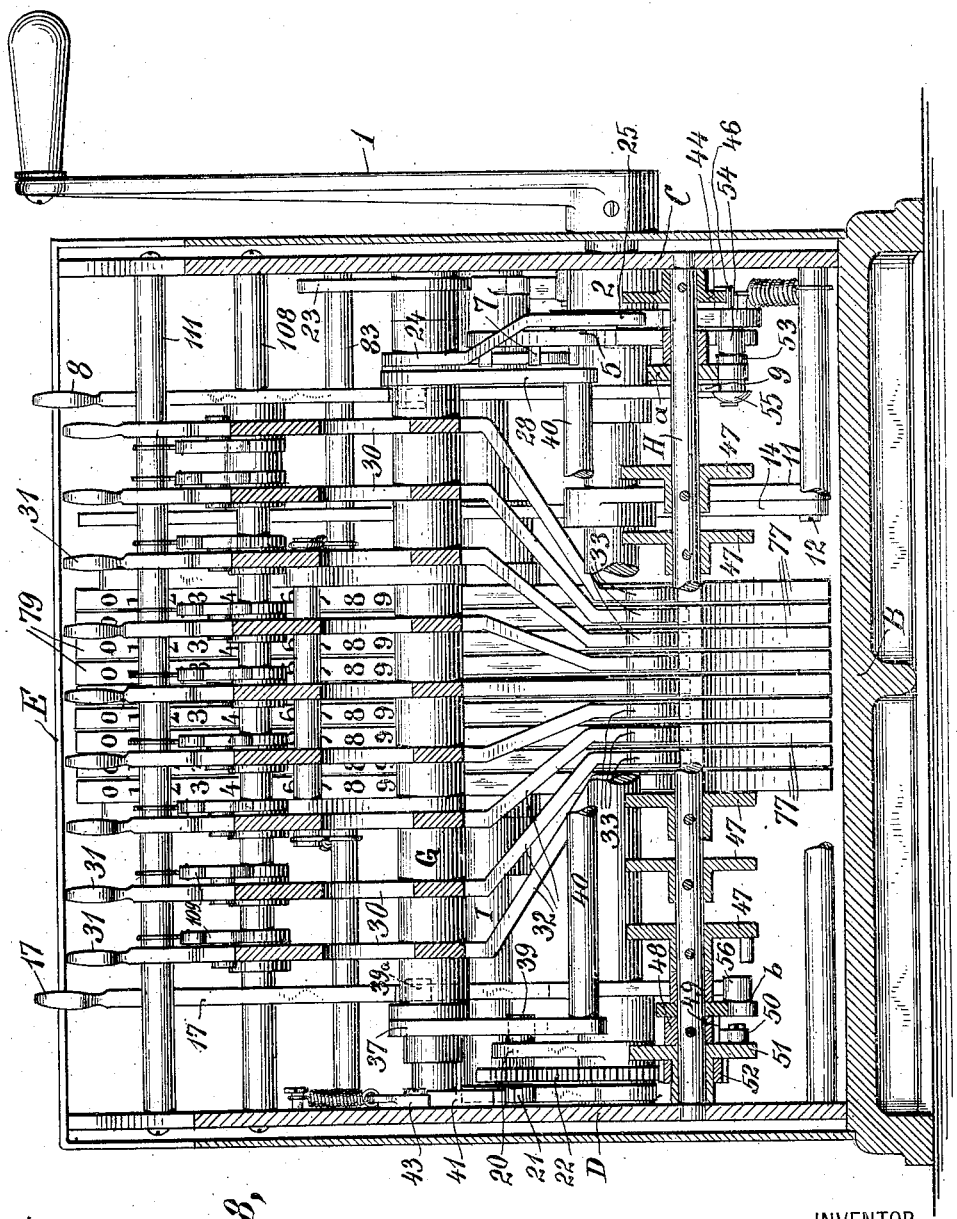

In the accompanying drawings, forming a part of this specification, Figure 1 is a plan view of my invention with a part of the case thereof broken away to show a part of the mechanism, and especially that part located at the right hand side of the machine: Fig. 2 is a front elevation with the case partly broken away, to expose the mechanism located on the left hand side of the machine: Fig. 3 is a side elevation on line 3—3 of Fig. 2, showing the machine with left hand frame removed, and disclosing the full stroke mechanism, the frame of the adding mechanism, the tappet shaft, and the total and zero key and its connections. Fig. 4 is a side elevation on line 4—4 of Fig. 1, showing clearly the arrangement of the actuating segments, type racks, adding device, printing mechanism, and their connections. Fig. 5 is a plan view on line 5—5 of Fig. 1, showing the arrangement of parts of the machine, specially the paper and ribbon feeds. Fig. 6 is a plan view on line 6—6 in Fig. 1, showing the sub-total key, the driving mechanism, the catch for type rack frame and their connections. Fig. 7 is a rear elevation on line 7—7 of Fig. 3 with case and printing mechanism removed, showing fully the arrangements of parts. Fig. 8 is a front elevation on line 8—8 of Fig. 3, partly in section, looking toward the rear of the machine. Fig. 9 is a plan view, partly in section, on line 9—9 of Fig. 3, showing the arrangement of the main shaft and adding mechanism, and their connections. Fig. 10 is a plan view, partly in section, on line 10—10 of Fig. 3, showing the construction and arrangement of operating segments and their shaft. Fig. 11 is a plan view, partly in section, on line 11—11 of Fig. 3, showing the construction and arrangement of type racks, their frame, shaft and connections. Figs. 12, 13, 14 and 15, show side elevation of adding mechanism in different positions which its parts assume when operated.

Referring to the several drawings, it will be seen that the mechanism there shown is contained in a frame work composed of a base B, and sides C, D, protected by the cover E. In this frame are placed the several shafts upon which the different parts of the mechanism are mounted. The main or driving shaft F, has fixed on one of its ends at the outside of the case the main or operating lever 1, which lever has a movement forward and backward of one sixth of a complete revolution. Fast to the shaft F, near its right hand end, is the casting 2 (Figs. 6, 7 and 9), having a front end or projection 3; and on its opposite end is mounted a spring actuated pawl, 4. Fast to the side of the casting 2 is the stud 4ª (Figs. 5 and 7) which works in the slot 15 of the ribbon-feed slide 16, and also fast to said casting is the large spiral spring 2ª, having its other end fastened to the cross rod 2ᵇ. This spring operates to return the lever 1 to its normal opsition when released by the operator after movement.

Loosely mounted on the shaft F next to the casting 2 is a cam wheel 5, in the edge of which are cut six cam notches, 6, and from the side of which project six studs, 7. Loosely mounted on said shaft F beside the cam wheel 5 is the special lever 8, whose lower end or foot 9 is double cam-shaped, and has a cam notch 10 on its front edge. On shaft F, near said lever 8 is fixed an arm 11, on which arm is fixed the stud 12, which works in the slot 13 of the paper-feed-slide, 14. (See Fig. 5.) On said shaft F, near its left hand end is loosely mounted the special lever 17, whose lower end or foot 18 is single cam shaped, and which has a cam notch 19, like the notch 10 in the lever 8. Fixed to the left hand end of the shaft F is an arm 20, and a ratchet sector 21, and gear segment 22. (See Figs. 3, 7, 8 and 9.) Mounted just above and parallel to the shaft F is the shaft G, on the right hand end of which is fixed the cam arm 23 (Figs. 6, 8 and 10), and beside this cam arm, and loosely mounted on said shaft G is the arm 24 (Figs. 7, 8 and 10) whose front end, 25, is hook-shaped, and works with the projection 3 of the casting 2 to lock the main lever 1 when the machine is given too rapid movement. The extreme rear end 27 of the cam arm 24, is also hook-shaped, and acts as a latch for the printing mechanism. Depending from the rear end of the arm 24 is a foot 26, which rests on one of the studs 7 of the wheel 5, and rocks said arm 24 to unlatch the printing mechanism. If the lever 1 be violently moved, the arm 24, through the studs, 7, which raise the foot 26, will throw the hook 25 under the projection 3 of the casting 2, and lock the main lever 1. By then releasing the pressure on the lever 1 it will be unlocked and may then be drawn forward. Next to the arm 24 is the arm 28, rigidly fixed to the shaft G, and carrying a stud 29, which acts in the cam notch 10 of the special lever 8 on shaft F (see Figs. 3, 4, 5 and 6). On the middle of the shaft G are loosely mounted the actuating segments 30, from which project through the cover E handles 31; and from which depend arms, 32, terminating in ball-surfaces 33, which act in the slots, 78, of type slides 77, to operate them. (See Figs. 3, 4 and 10.) The front portions of these segments 30, have gear teeth 34, which drive adding wheels 57, and the rear portions thereof have V shaped teeth, 35, which co-act with studs 35ᵃ, and hold said segments in the positions to which they may be turned. On these segments 30, are also projections, 36, upon which the rock shaft 40 bears. To the left of the segments is fastened the arm 37 (Fig. 3), the rear portion of which is slotted as at 38. In this slot 38 the stud 39, fixed on the arm 20, works and rocks said arm 37, and shaft G. (See Figs. 2, 3, 8 and 10.) Mounted on the arm 37 is the stud 39ᵃ, which works in the cam notch 19, of special lever 17 to force said lever back to its normal position when moved therefrom. To the lower parts of the arms 28 and 37 is fixed the rock shaft 40, which when swung upward by rotation of the shaft G contacts with the projections 36 of the segments 30, and forces said segments upward to their normal positions.

Loosely mounted on the extreme left hand of the shaft G is the spring pressed double ratchet pawl or dog, 41, which acts, with double ratchet sector 21, to limit the movement of operating lever 1, to one-sixth of a revolution forward and backward, and prevents any return movement thereof until said full movements have been effected. This ratchet dog 41 is held in either of two positions, where it is forced by the high portion 42 on the ratchet sector 21, by the spring pressed pawl 43 pivoted to said frame D. (See Figs. 2, 3 and 8.)

The shaft H is mounted in frames C, D, in front of and a little below the shaft F. Loosely mounted on this shaft H is the adding frame composed of side frames a, b, connected by shafts c, d, e, screwed to them. Fast to the right hand end of shaft H is a notched disk, 44, in whose notch, 45, a stud, 46, fast to the casting 2, enters and locks shaft H from further rotation and from overthrowing. See Figs. 4, 6, 7, 8 and 10. Between the said frames a, b, on the shaft H are fixed cams 47 (Figs. 8, 10, 12 and 15) which are part of the transfer mechanism of the adding device. On the left hand end of the shaft H, and just outside the frame b is fixed a collar, 48, having a notch, 49, in which works the spring-pressed pawl 50, which pawl is pivoted to a disk, 51, fast to the gear 52; said disk 51 and gear 52 being loosely mounted on the shaft H. The gear 52 is driven by the segment gear 22, fixed upon the main shaft F, and through its ratchet and pawl connection, the shaft H is given a full revolution, as the main lever 1 is making its backward movement to its zero position. (See Figs. 2, 3, 8 and 9.)

The rear end or arm of the frame a has mounted in it a plunger stud 53, whose outer end, 54, works on the face of the cam wheel 5, and whose inner end or head 55, bears against the cam surface of the foot 9, which cam operates to force the stud 53 to the left, withdrawing the outer end 54 from the notch 6, in the cam wheel 5, and holding it out of such notch, until the said wheel 5 is rotated some distance, and until the special lever 8 has been forced back to its normal position, when it will be released, and its spring will press it against the side of the wheel 5, until another notch 6, comes opposite to it, when it will enter said last mentioned notch 6. (See Figs. 7, 8 and 9.) If the special lever 8 has not been operated the plunger stud 53 will remain in the notch 6 across the face of the cam wheel 5, and when said wheel 5 is rotated by the main lever 1, through the pawl 4 contacting with a notch 6, the cam wheel will force said stud 53 outward and away, thereby rocking the said adding frame on the shaft H, and will throw the gears attached to the adding wheels into mesh with the gear teeth 34 of the segments 30, where they will remain until the forward movement of lever 1 has been finished, when another notch 6 on said wheel 5 will have advanced opposite to the stud 53, and allow said stud to enter therein, when the adding frame will drop forward until it rests on the stud 54ᵃ attached to the main frame C, thereby withdrawing the gears or adding wheels from the gear teeth of the segments 30. Fixed to the rear end or arm of the frame $b$ is a stud 56 (Figs. 2, 7, 8 and 9), which is in line with the plunger stud 53, and which is acted upon by the cam or foot 18 of the special lever 17, and, by its action, rocks the adding frame upward, throwing the gears on the adding wheels into mesh with the gears on the segments, 30, as is done by the special lever 8.

Loosely mounted on the shaft $f$ of the adding frame, and equally spaced apart, are adding wheels, 57, corresponding in number to the actuating segments 30. (Figs. 1, 2, 4, 5, 12 and 15). Fixed to the right hand side of each of these wheels 57 are the gears 58, and projecting from the opposite side of the wheels are the studs 59. Mounted loosely upon shaft $d$, are the actuating detents, 60, and the secondary cams 61, the actuating detents being positioned to the right of the adding wheels 57, and working in gears 58 of said adding wheels, and co-acting with secondary cams 61 placed respectively at the left of the wheels 57. Said secondary cams 61 are operated by studs 59 placed on the faces of said wheels 57. Fixed to said secondary cams 61 are the studs 62, which project from the left sides of said secondary cams and under the projections 63 of the actuating detents 60, to the left of them. The lower portion of each secondary cam 61 has two V shaped notches, 64, 64$^a$, into which the pawls 65 are alternately projected to hold said cams 61 in either of the two positions to which they are forced by the studs 59 of the adding wheels 57 or by the cams 47 fixed on the shaft H (see Figs. 12, 13, 14 and 15). The pawls 65 are loosely mounted on the shaft $e$, and so spaced that they act on the secondary cams 61, as explained. The actuating detents 60 and the pawl 65 are spring-tensioned toward each other by the spring 66 attached to both of them, which forces them to normal position when displaced.

Mounted loosely on the shaft $c$ is the restoring frame 67, which normally rests on the rod 68, fixed to the frame $a, b$, (Fig. 9), and, through projection 69 on one of its arms coming into contact with the stud 70 fixed to the cam 47, is lifted, and its edge 71, bearing under the curved surfaces 72, of the secondary cams 61, operates to force them upward to their normal positions where they are held by pawls 65, entering the notches 64$^a$ of the secondary cams 61. (See Figs. 4, 5, 12.) When the stud 70 passes the projection 69 the restoring frame 67 will drop until it rests on the rod 68, when its edge 71 will be out of the path of the secondary cams 61.

The shaft I is mounted in the frames C, D, (Figs. 1, 3, 11) near the rear of the machine, and to it is fixed the printing slide-frame L, composed of sides 73, 74, cross piece 75 and cross rod 76, fixed to the same. Slidably mounted in this slide frame L are the printing slides 77, in the lower portion of which are square openings 78, in which work the ball-shaped surfaces 33, of segments 30, and by which the slides are connected to segments 30. (See Fig. 4.) On the upper edges of slide 77 are figures 79 (Figs. 1, 2, and 8) and on the rear upper edges are the raised type figures 80. (Figs. 1, 4 and 7.) Both of these sets of figures are so placed that when the handles 31 of segments 30 stand opposite figure on scale 81, 80 on cover E (Figs. 1 and 2), the figures 79 will be opposite to the sight opening 82 of cover E, and the type figures 80 will stand opposite to printing platen 82$^a$. Fast to cross rod 76 and to cross shaft 83 are springs 84, which force the printing slide-carriage L, toward platen 82$^a$ when the frame is unlatched by action of the lever 1. The printing slide-frame is fast to shaft I and is normally in the position shown in Figs. 4 and 13 of the drawings, being held against tension of the springs 84 by the hooked end 27 of the arm 24 catching over the projection 85 fast to the hub of the shaft I. (See Figs. 1, 4, 10 and 11.)

Fixed to the shaft I next to the projection 85 is the hub 86 to which is fixed the arm 87, which is acted upon by the cam arm 23 fixed to the shaft G which forces said arm 87, and, through it, the printing frame forward against tension of the springs 84 until the hook 27 drops back of the projection 85, thereby holding said frame in normal position. Fixed to the hub 86 is the depending arm 88, which, when the printing frame is released contacts with the adjustable stop 89, preventing the type on slide 77 from striking the paper too hard, and holding them away from said paper after the printing operation.

At the rear of the main frame is fastened the frame K, in which is mounted the paper roll 90, the platen 82$^a$ the pressure roll frame 91, and the ink ribbon 92, and their mechanisms, and also the guard 93, through whose opening 94 the figures printed on the strip 95 are read. This guard 93 serves to guide strip 95 from the roll 90 between the pressure roll 96, and platen 82$^a$, and over said platen and its upper edge 97, and is formed to facilitate the severing of the strip 95 by the operator. The pressure roll frame 91 is fixed to the shaft 98 mounted in the frame K. Fast to the outer end of the shaft 98 is the handle 99, and depending from said handle 99 is the frame 100, to which is attached one end of a spring 100$^a$, the other end of which is fast to the frame K. By this means the pressure roll is held in contact with the platen 82$^a$, but can be rocked away by the handle 99 when the paper strip 95 is to be inserted between the rolls.

On the shaft 101 of the platen 82ª is fixed a ratchet wheel 102 (Figs. 1 and 5), which is operated by the paper feed slide, 14, being lifted by the stud 12 on the arm 11, fast to the main shaft F, the slide being kept in contact with the ratchet 102 by the spring 103, fast to it, and to the cross rod 83. To the shaft 104, which is mounted in the frames C, D, is fast the ratchet 105, which, in connection with the spring pressed pawl 106, fast to the ribbon feed slide 16, operates the ribbon feed mechanism. The slide 16 is raised by the stud 42 attached to the casting 2 working in the slot 15 of the slide 16. The shaft 104 is prevented from backward movement by pawl 107 pivoted to shaft 108, spring pressed into the teeth of the ratchet wheel 105.

Mounted loosely on the shaft 108 are the spring-drawn arms 109, one for each actuating segment 30. To these arms are fixed studs or rollers 35ª, which work in V shaped notches 35 of the segments 30, and hold them in set position. Springs 110 are fast to the upper parts of arms 109, and to the cross rod 111 mounted in the frames C, D.

The ink ribbon 92 is wound on the spools 112, which are frictionally held to upright shafts 113 mounted in the frame K. In the lower ends of these shafts 113 are fixed worm wheels 114, which are driven by worm gears 115 fixed to shaft 104, which shaft is turned forward by the pawl 106, mounted in the slide 16. This slide 16 is moved upwardly and downwardly at each operation of the lever 1.

Operation: Having described the several parts of my machine, and their connections, I will now explain the operation of the same when adding and printing figures, assuming the parts to be in their zero or normal position, with handles 31 above the zeros on the scale 81, no figures showing through the upper opening 82, and zeros appearing through the lower sight openings 82ᵇ, of the case E.

The handles 31 of segments 30 are depressed until they stand opposite to figures in scale 81 corresponding to the figures selected and the same figures 79 on the face of printing slides 77 appear in opening 82, and the corresponding type 80 on the rear of printing slides 77 stand opposite to the platen 82ª, as these slides 77 have been elevated as many spaces as segments 30 have been depressed, by the ball surfaces 33 working in slots 78 of the slides 77. The operating lever 1 is then drawn forward with the following results: At the beginning of its movement, through the pawl 4 contacting with face of notch 6 of rotating cam wheel 5, arm 24 will be lifted by pin 7 contacting with foot 26 of arm 24, raising hook 27 from projection 85 fast to hub of printing frame L, unlatching said frame L, allowing it to be propelled against the platen 82ª, and through the ink ribbon 112 printing the figures, that were set up by segments 30, on the paper strip 95. At this time the adding frame e through the contacting of plunger stud 53, mounted in arm a of said adding frame, with the face of the cam in wheel 5, will be rocked on shaft H, and the gears 58 of the adding wheels 57, brought into mesh with gear teeth 34 of segments 30. Just at this time the rock shaft 40, through the stud 39 in arm 20 fast to shaft F, working in slot 38 of arm 37 to which shaft 40 is attached, will be swung upward and, coming in contact with surfaces 36 on segments 30 that have been depressed, will force segments 30 and slides 77 back to their normal positions. During this movement of lever 1 the printing slide frame L, through the contact of cam arm 23 fast to shaft F, with arm 87 fast to hub of said slide frame L, will be forced away from platen 82ª, and be again latched in its normal position. On the backward movement of segments 30 the adding wheels 57, through the gear connection with segments 30, will be rotated forward as many teeth or numbers as were indicated at sight opening 82, when segments 30 were depressed, and printed on the strip 95. During the forward movement of lever 1, and near the completion of it, the paper strip 95, through its feeding slide 14 and its connections with said lever 1, will be advanced one space bringing the figures printed on the strip 95 into view in opening 94 of guard 93; and likewise the ink ribbon 92 will be advanced one space by its feeding slide 16 and its connections with lever 1, through the worm gears 115 and worm wheels 114. On the backward movement of the lever 1, which is assisted by spring 2ª, the cam shaft H, through segment 22, fast to shaft F, working in gear 52 fast to disk 50, both being loosely mounted on shaft H, and which have been rotated backward one revolution by forward movement of lever 1, bringing pawl 50 in engagement with notch 49 in collar 48 fast to shaft H, will be given a forward rotation, carrying the transferring cams 47. These cams advance any adding wheels 57 of higher denomination one tooth or number when any adding wheel 57 of lower denomination, that is to their right, has been given a complete revolution,—that is when more than nine units have been added to said lower denomination adding wheels 57.

In the above operation, just described, no adding wheels 57 have been advanced beyond nine units or spaces, as no higher number could have been set up by the segments 30. But if the operation is repeated and any wheels 57 have been advanced more than nine units or spaces, and the cam shaft H is given a revolution, then the following results will ensue: The secondary cams 61, corresponding to the adding wheels 57 that have been so advanced, will have been forced by studs 59 of said adding wheels 57, from normal position shown in Fig. 12, into the path of their related primary cams 47 to positions shown in Fig. 13; and in the backward movement of lever 1, as before described, the shaft H, in rotating, will bring the primary cam 47 that is in line with the displaced secondary cam 61, into contact with it, and force it downward from position shown in Fig. 13 to that shown in Fig. 14. This downward movement of secondary cam 61 will, through the stud 62, fast to secondary cam 61, and projecting from it under the heel 63 of the actuating detent 60 to the left of it, rock said actuating detent 60, on the shaft $d$, and advance the adding wheel 57, related to said actuating detent 60, one tooth or number, and will also hold said wheel in this advanced position against accidental movement, thus transferring one number to the adding wheel 57 next higher in denomination than the adding wheel which has been advanced by segments 30 more than nine units or numbers. These primary cams 47 are arranged spirally about shaft H; the one in advanced position being at the right, and in path of the secondary cam 61 that is at the left of the units adding wheel 57; and as these primary cams 47 are given a full forward revolution at each backward movement of lever 1 all adding wheels 57 to the left of these wheels 57 to which have been added more than nine numerals will be given the extra movement of one number at the proper time. As the shaft H has almost completed its movement the stud 70 fast to one of the primary cams 47 will contact with foot 69 of resetting bar 71, elevating the bar 71, which, coming in contact with any depressed secondary cam 61, will return them to normal position, where they will be held by pawl 65 working in notch 64 of secondary cam 61. All parts are then in normal position ready for the next operation.

Operation of printing total shown on adding wheels, which is the sum of figures printed on the strip, and at the same operation returning the adding wheels to zero position, thereby clearing the machine for another operation: The special or zero lever 8 at the right of handles 31 of actuating segments 30 is drawn forward bringing one of the cam surfaces on foot 9 of same in contact with head 55 of plunger 53, mounted in arm $a$ of total adding frame, thereby withdrawing the other end 54 of this stud 53, out of the cam-slot 6 of cam-wheel 5.

At the same time the other cam surface on foot 9 of lever 8 will come in contact with body of stud 53, and through it force the adding frame upward, throwing gears 58 of adding wheels 57 into mesh with gear teeth 34 of actuating segments 30. The segments 30 are then depressed by handles 31, thereby turning the adding wheels 57 backward, until studs 59 on wheels 57 contact with top curved surfaces 61$^a$ of secondary cams 61, when they can go no farther, and in which position they are all at zero. This operation, through ball connections 33 of segments with slots 78 of slides 77, elevates these slides until the figures corresponding to those that were on the total wheels 57 are brought to view in openings 82 of case, and the type 80 corresponding to these figures are brought opposite platen 82$^a$ in printing position. The main lever 1 is then drawn forward, first unlatching printing slide frame, thereby printing the total on the strip 95, then forcing back to normal position the special or zero lever 8, which will allow the adding frame to drop downward, carrying the gears 58 out of mesh with teeth 34 of segments 30, and allowing plunger stud 53 to move toward the cam wheel 5; but as this wheel has begun its forward movement the end 54 of stud 53 cannot enter slot 6 of wheel 5, but will ride against the side of said wheel until the wheel 5 has been given one-sixth of a revolution, when another slot 6 will be opposite stud 53, and allow said stud to enter it. As this stud 53 was out of path of movement of the cam-face of notch 6, when the wheel 5 was rotated, it would not raise the adding-frame to connect the adding gears with gears of the segments, the adding wheels 57 will not have been rotated forward by the backward movement of segments 30, as in the regular operation of adding and printing when the special lever 8 had not been operated. The paper and ribbon will be fed forward by this operation, as in the regular operation of adding and printing, and the printing frame will be again forced to normal position and there latched.

Operation of printing total shown on adding wheels, and at the same time leaving the total on the wheels to which more figures are to be added, which is called printing a sub-total: The special or sub-total key 17 at the left of the handles 31 of actuating segments 30, is drawn forward, bringing the cam-surface 18 on the foot of special key 17, in contact with stud 56, fast to arm $b$ of the adding-frame, thereby forcing the adding-frame upward, throwing gears 58 of the adding wheels 57 into mesh with the gear teeth 34 of the actuating segments 30. The segments 30 are then depressed as before, being stopped by the studs 59 on the wheels 57 contacting with the top edge 61$^a$ of the secondary-cams 61, thus bringing the adding wheels to zero, and the printing slides 77 to printing position with corresponding figures that were shown on the total, opposite the platen 82ᵃ. The main lever 1 is then drawn forward, causing the printing on the strip 95, and the returning of the special sub-total key to normal position, but as plunger stud 53 has not been withdrawn from cam-slot 6 of the cam wheel 5, the wheel 5 when rotated by the main lever 1, will, through stud 53, retain the adding frame in elevated position, where it was forced by the special subtotal key 17, thereby holding the adding wheel gears 58 in mesh with the gears 34 of the segments 30; and when these segments are being returned by forward motion of main lever 1, they will rotate the adding wheels forward, returning them to the position they occupied before they were turned back by downward movement of the segments 30, and they will display the same figures as before they were turned back, which was the total of the figures printed on strip 95 before special subtotal key 17 was operated. The printing frame will be relatched, the strip 95 will be advanced so that sub-total will be in view, the ribbon fed downward as before, and the machine will be ready for the further addition and printing of figures, as desired, to the sub-total as printed.

Having thus described my invention, I claim,

1. In mechanism of the kind described, a series of manually operable actuating segments; a series of slides bearing printable characters, and a ball and groove connection between each of said segments and one of said slides.

2. In mechanism of the kind described, a series of manually operable actuating segments; a series of slides bearing printable characters; a ball and groove connection between each of said segments and one of said slides; and a series of spring-detents connected, respectively, with said actuating segments to hold them in their set positions.

3. In mechanism of the kind described, a series of manually operable actuating segments; a series of slides bearing printable characters; a ball and groove connection between each of said segments and one of said slides; a series of spring-detents connected, respectively, with said actuating segments to hold them in their set positions, and means for returning said segments to their initial positions after operation.

4. In mechanism of the kind described, a pivoted frame, a series of slides carried thereby bearing printable characters; a platen positioned to co-act with said slides; means for forcing said frame and slides toward said platen for printing; means for withdrawing said frame and slides from said platen, and means for latching said frame in the position to which it is withdrawn.

5. In mechanism of the kind described, a rotatable cam-disk; a pivoted frame so connected with said disk as to be rocked by its action; an actuator for rotating said disk; means, independent of said disk, for rocking said frame, and means, operable by said actuator, for returning said independent means to its initial position after operation.

6. In mechanism of the kind described, a rotatable cam-disk; a frame containing adding mechanism positioned to be movable by the rotation of said disk; means, independent of said disk, for moving said frame and to prevent said disk from moving said frame.

7. In mechanism of the kind described, a rotatable cam-disk; a frame containing adding mechanism positioned to be movable by the rotation of said disk; means, independent of said disk, for moving said frame and to prevent said disk from moving said frame; and means for returning said independent means to its initial position after its operation.

8. In mechanism of the kind described, a main lever for operating said mechanism; a printing mechanism normally latched in non-operable position; a pivoted latch for latching said printing mechanism and arranged to co-act with said main lever to lock it and stop it if moved too rapidly when said printing mechanism is being unlatched for operation.

9. In a mechanism of the class described, the combination with a main driving shaft, of a frame, movable printing slides supported by said frame, a platen against which said printing slides may be projected, a rock shaft adapted to rock said frame to project said printing slides against said platen and retract them therefrom, and means intermediate said main driving shaft and said rock shaft adapted positively to lock said driving shaft upon an excessive speed in movement thereof at the period in the operation of the same when the operation of the printing device is effected.

10. In a machine of the class described, transfer mechanism comprising oscillating actuating detents, spring means for restoring and holding said actuating detents in detenting position, mechanically operative means for successively actuating said detents, and positive means operable upon the completion of an operation of said mechanical means, positively to restore said actuating detents in the event of a failure of said spring means.

11. In a machine of the class described, the combination of a rotatable cam disk, a frame containing adding mechanism and arranged to be moved by rotations of said disk, and an adjustable lever for moving the frame and preventing the disk from moving said frame.

12. In a machine of the class described, the combination with operating devices, of a rotatable cam disk, a frame containing accumulator mechanism and arranged to be moved by rotations of said disk, an adjustable lever for moving said frame and preventing the disk from moving the frame, and means comprised by said operating devices for restoring said lever from adjusted to normal position.

FREDERICK L. FULLER.

Witnesses:
 JNO. N. VAN DEMAN,
 W. C. SMITH.

Copies of this patent may be obtained for five cents each, by addressing the "Commissioner of Patents, Washington, D. C."